United States Patent
Yi et al.

(10) Patent No.: US 7,970,134 B2
(45) Date of Patent: Jun. 28, 2011

(54) METHOD FOR GENERATING, OPERATING, AND USING A SPARSE W-NAF KEY FOR ENCRYPTION

(75) Inventors: Jeong-hyun Yi, Daejeon (KR); Jung-hee Cheon, Seoul (KR); Tae-chul Jung, Seongnam-si (KR); Tae-kyoung Kwon, Seoul (KR); Hong-tae Kim, Chungcheongbuk-do (KR); Mun-kyu Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 988 days.

(21) Appl. No.: 11/889,366

(22) Filed: Aug. 13, 2007

(65) Prior Publication Data

US 2008/0130878 A1 Jun. 5, 2008

(30) Foreign Application Priority Data

Dec. 1, 2006 (KR) .......................... 10-2006-0120827

(51) Int. Cl.
*H04L 9/00* (2006.01)
*G06F 1/02* (2006.01)
(52) U.S. Cl. .......................................... 380/44; 708/277
(58) Field of Classification Search .................... 380/44; 708/277
See application file for complete search history.

(56) References Cited

U.S. PATENT DOCUMENTS

| | | | | |
|---|---|---|---|---|
| 6,212,279 | B1* | 4/2001 | Reiter et al. | 380/278 |
| 6,243,467 | B1* | 6/2001 | Reiter et al. | 380/30 |
| 7,062,043 | B1* | 6/2006 | Solinas | 380/30 |
| 7,062,044 | B1* | 6/2006 | Solinas | 380/30 |
| 2002/0041681 | A1* | 4/2002 | Hoffstein et al. | 380/28 |
| 2003/0235300 | A1* | 12/2003 | Solinas | 380/30 |
| 2004/0119614 | A1* | 6/2004 | Joye | 341/50 |
| 2008/0226083 | A1* | 9/2008 | Yi et al. | 380/282 |

OTHER PUBLICATIONS

Chae Hoon Lim & Pil Joong Lee. Sparse RSA Secret Keys and Their Generation. 1997. p. 1-15.*

* cited by examiner

*Primary Examiner* — Christian LaForgia
(74) *Attorney, Agent, or Firm* — NSIP Law

(57) ABSTRACT

A method for generating, operating, and using a sparse w-NAF key for encryption is disclosed. The method for generating a key comprises generating a string of a number of coefficients, in which at most one coefficient, excluding 0, among a consecutive w number of coefficients, corresponds to a positive odd integer equal to or less than $2^w$ (w being a natural number equal to or more than 2); and outputting the generated string as a key. Accordingly, an encryption is executed through an exponential operation or scalar multiplication using a sparse w-NAF key having the scarce coefficients, excluding 0, such that an encryption pace is improved.

20 Claims, 4 Drawing Sheets

METHOD FOR GENERATING, OPERATING, AND USING A SPARSE W-NAF KEY FOR ENCRYPTION

CROSS-REFERENCE TO RELATED APPLICATION

This application claims the benefit under 35 U.S.C. §119(a) of Korean Patent Application No. 2006-120827, filed Dec. 1, 2006, in the Korean Intellectual Property Office, the entire disclosure of which is hereby incorporated by reference.

TECHNICAL FIELD

The following description relates to a method for generating a key, and, more particularly, to a method for generating a key, which reduces computational complexity accompanying an encryption, and a method for operating and encrypting using the generated key.

BACKGROUND

The increased importance of information security has brought many proposals for encryption. Diffie-Hellman (DH) encryption and Elliptic Curve Cryptography (ECC) are examples of encryption methods proposed for more effective information security.

The Diffie-Hellman (DH) encryption involves exponential operations in the process of encryption. There are also many other different methods for encryption which involve exponential operation.

For more stable information security, a length of key to be an exponent in exponential operation has to be sufficiently long. However, if the key to be an exponent is lengthened, more exponential computations are required such that an operation pace is slowed. A lowered operation pace is more severe in mobile devices which have slower processors.

ECC involves scalar multiplication in the process of encryption.

In the case of ECC, the length of the key as a coefficient being multiplied on a coordinate in scalar multiplication has to be long enough for more stable information security. However, if the key is lengthened, more scalar multiplication computations are required, such that the operation is slowed. The falling-off in operating pace is more severe in the mobile devices which have slower processors.

Accordingly, there is a need for an improved method for generating a key which increases encryption pace by reducing the computational complexity accompanying the encryption.

SUMMARY

In one general aspect, a method for generating a key may comprise, a) generating a string of a number of coefficients, in which at most one coefficient, excluding 0, among a consecutive w number of coefficients, corresponds to a positive odd integer equal to or less than $2^w$ (w being a natural number equal to or more than 2); and b) outputting the generated string as a key.

In order to achieve the above object, a method for generating a key according to exemplary embodiments of the invention may comprise, a) generating a string of a number of coefficients, in which at most one coefficient, excluding 0, among a consecutive w number of coefficients, corresponds to a positive odd integer equal to or less than $2^w$ (w being a natural number equal to or more than 2); and b) outputting the generated string as a key.

General aspects also provide that generating the string may comprise, a1) selecting t groups from $(m-(w-1)*t)$ groups; a2) replacing the respective selected t groups with a string of coefficients comprising a positive odd integer equal to or less than $2^w$ and $(w-1)$ zeros; and a3) replacing unselected groups with zeros and generating the key. Wherein, m and t may be positive integers.

General aspects provide that the positive odd integers equal to or less than $2^w$ of the string may follow $(w-1)$ zeros.

General aspects also provide that the outputting of the generated string comprises excluding the coefficients ahead of the first coefficient, excluding 0, of the generated string.

In accordance with another general aspect, a method for exponential operation comprises, a) generating a key of a number of coefficients, in which at most one coefficient, excluding 0, among a consecutive w number of coefficients, corresponds to a positive odd integer equal to or less than $2^w$ (w being a natural number equal to or more than 2); and b) executing an exponential operation using the generated key as an exponent.

General aspects also provide that the generating of the key may comprise, a1) selecting t groups from $(m-(w-1)*t)$ groups; a2) replacing the respective selected t groups with a string comprising a positive odd integer equal to or less than $2^w$ and $(w-1)$ zeros; and a3) replacing unselected groups with zeros and generating a key.

In accordance with another general aspect, a method for encryption comprises, a) generating a key of a number of coefficients, in which at most one coefficient, excluding 0, among a consecutive w number of coefficients, corresponds to a positive odd integer equal to or less than $2^w$ (w being a natural number equal to or more than 2); b) executing an exponential operation using the generated key as an exponent; and c) executing encryption using the value of exponential operation.

General aspects also provide that the generating of the key may comprise, a1) selecting t groups from $(m-(w-1)*t)$ groups; a2) replacing the respective selected t groups with a string comprising of a positive odd integer equal to or less than $2^w$ and $(w-1)$ zeros; and a3) replacing unselected groups with zeros and generating the key.

In accordance with another general aspect, a method for generating a key comprises, a) generating a string of a number of coefficients, in which at most one coefficient, excluding 0, among a consecutive w number of coefficients, corresponds to a non-divisible integer by q with an absolute value equal to or less than $q^w/2$; and b) outputting the generated string as a key.

General aspects also provide that the generating of the string may comprise, a1) selecting t groups from $(m-(w-1)*t)$ groups; a2) replacing the respective selected t groups with a string comprising a non-divisible integer by q with absolute value equal to or less than $q^w/2$, and $(w-1)$ zeros; and a3) replacing unselected groups with zeros and generating the string, wherein m and t may be positive integers.

General aspects provide that non-divisible integers by q with absolute value equal to or less than $q^w/2$ may follow $(w-1)$ zeros.

General aspects also provide that the outputting of the generated string outputs a string excluding the coefficients ahead of the first coefficient, excluding 0, of the generated string as the key.

In accordance with another general aspect, a method for scalar multiplication comprises, a) generating a key of a number of coefficients, in which at most one coefficient, excluding 0, among a consecutive w number of coefficients, corresponds to a non-divisible integer by q with an absolute value equal to or less than $q^w/2$; and b) executing scalar multiplication on the basis of the key.

General aspects provide that the generating of the key may comprise, a1) selecting the t groups from $(m-(w-1)*t)$ groups; a2) replacing the respective selected t groups with a string comprising a non-divisible integer by q with absolute value equal to or less than $q^w/2$ and (w-1) zeros; and a3) generating the string by replacing unselected groups with zeros, wherein m and t may be positive integers.

In accordance with another general aspect, a method for encryption comprises, a) generating a key of a number of coefficients, in which at most one coefficient, excluding 0, among a consecutive w number of coefficients, corresponds to a non-divisible integer by q with an absolute value equal to or less than $q^w/2$; b) executing scalar multiplication on the basis of the generated key; and c) executing the encryption using the value of scalar multiplication.

General aspects provide that the generating of the key may comprise, a1) selecting the t groups from $(m-(w-1)*t)$ groups; a2) replacing the respective selected t groups with a string comprising a non-divisible integer by q with absolute value equal to or less than $q^w/2$, and (w-1) zeros; and a3) replacing unselected groups with zeros and generating the key, wherein m and t may be positive integers.

A general aspect of a computer-readable recording media is provided, which writes a program for executing a) generating a string of a number of coefficients, in which at most one coefficient, excluding 0, among a consecutive w number of coefficients, corresponds to a positive odd integer equal to or less than $2^w$ (w being a natural number equal to or more than 2); and b) outputting the generated string as a key.

A general aspect provides a computer-readable recording medium storing a program, comprising a) generating a string of a consecutive w number of coefficients, in which at most one coefficient, excluding 0, corresponds to a non-divisible integer by q with an absolute value equal to or less than $q^w/2$; and b) outputting the generated string as a key.

Another general aspect provides an encryption device comprising a key generator for generating a key of a number of coefficients, in which at most one coefficient, excluding 0, among a consecutive w number of coefficients, corresponds to a positive odd integer equal to or less than $2^w$ (w being a natural number equal to or more than 2), an exponential operator for executing exponential operation using the generated key as an exponent, and an encryption part executing encryption using the value of exponential operation.

In another general aspect, an encryption device comprises, a key generator generating a key of a number of coefficients, in which at most one coefficient, excluding 0, among a consecutive w number of coefficients, corresponds to a non-divisible integer by q with an absolute value equal to or less than $q^w/2$, a scalar multiplier executing scalar multiplication on the basis of the generated key, and an encryption part executing the encryption using value of scalar multiplication.

BRIEF DESCRIPTION OF THE DRAWINGS

Throughout the drawings, the same drawing reference numerals will be understood to refer to the same elements, features, and structures.

DETAILED DESCRIPTION

The matters defined in the description such as a detailed construction and elements are provided to assist in a comprehensive understanding of the methods, mediums, and devices described herein. Accordingly, those of ordinary skill in the art will recognize that various changes and modifications of the devices, methods, and systems described herein can be made without departing from the scope and spirit of the devices, methods, and systems. Also, descriptions of well-known functions and constructions are omitted for clarity and conciseness.

Figure 1:
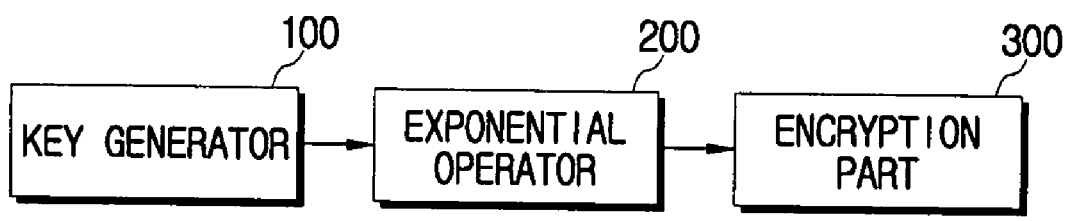
FIG. 1 is a block diagram illustrating an encryption device according to a general aspect.

FIG. 1 is a block diagram illustrating an encryption device according to a general aspect. According to a general aspect, the encryption device generates and uses a key to reduce exponential computations.

As illustrated in FIG. 1, the encryption device in accordance with a general aspect may comprise a key generator 100, an exponential operator 200, and an encryption part 300.

The key generator 100 generates an Unsigned w-NonAdjacent Form (w-NAF) key.

A w-NAF key satisfies the following conditions:
1) coefficient, excluding 0, is a positive odd integer with an absolute value equal to or less than $2^{w-1}$ (w being a natural number equal to or more than 2), and
2) Of a string of a consecutive w number of coefficients, at most one coefficient, excluding 0.

The absolute value of coefficients, excluding 0 is an odd integer equal to or less than $2^{w-1}$ such that a w-NAF key is the set of integers which include a negative odd integer. And, a consecutive w number of coefficients, at most one is coefficient, excluding 0, such that the number of coefficients, excluding 0, of consecutive w number of coefficients of a w-NAF key is either 1 or 0.

The Unsigned w-NAF key satisfies the following conditions:
1) coefficient, excluding 0, is a positive odd integer equal to or less than $2^w$ (w is a natural number equal to or more than 2) and,
2) Of a string of a consecutive w number of coefficients, at most one coefficient, excluding 0.

The Unsigned w-NAF key is different from the w-NAF key in that not the absolute value of the coefficients, excluding 0, but the coefficients, excluding 0, themselves are the positive odd integers equal to or less than $2^w$. In other words, the Unsigned w-NAF key is a set of integers which do not include a negative odd integer, but the w-NAF key may consist of a negative odd integer.

The exponential operator 200 executes an exponential operation using the Unsigned w-NAF key as an exponent and outputs an operation value.

The encryption part 300 executes encryption with the value of the exponential operation outputted from the exponential operator 200.

Herein below, i) the process of generating an Unsigned w-NAF key, ii) the process of executing an exponential operation using the Unsigned w-NAF key as an exponent, and iii) the process of executing an encryption with the value of exponential operation, are described in detail with reference to FIG. 2.

Figure 2:
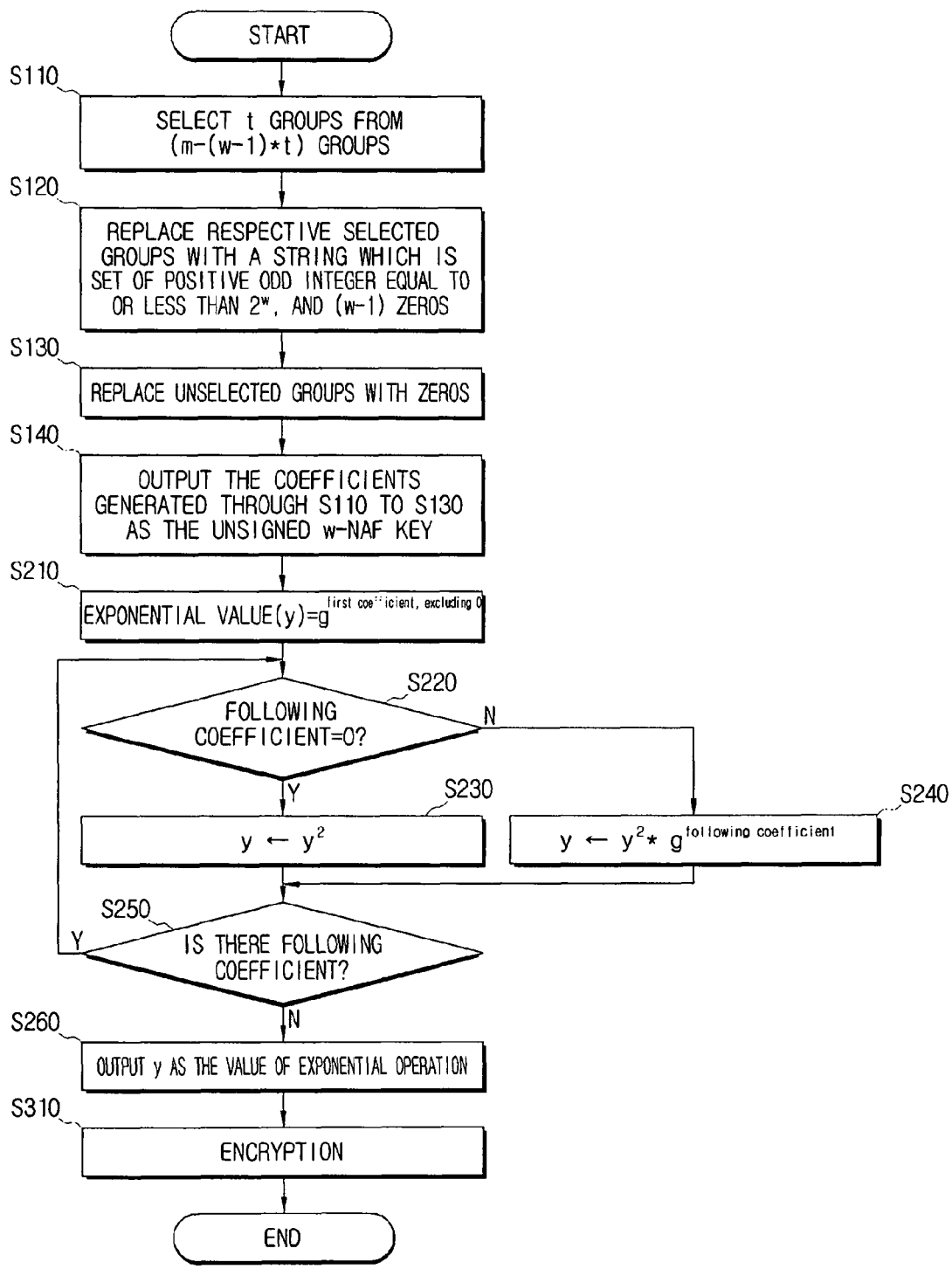
FIG. 2 is flowchart illustrating a method for encryption according to a general aspect.

FIG. 2 is a flowchart illustrating a method for encryption according to a general aspect.

Referring to FIG. 2, the key generator 100 selects t groups from (m−(w−1)*t) groups (S110), where, i) m is the number of coefficients consisting of an Unsigned w-NAF key to generate, ii) w is the number of coefficients consisting of selected groups, which is a positive integer equal to or more than 2, and iii) t is the number of coefficients, excluding 0 which are positive integers, among coefficients of an Unsigned w-NAF key.

For example, it is assumed that m (the number of coefficients of an Unsigned w-NAF key)=20, w(the number of coefficients of a selected group)=4, and t (the number of coefficients, excluding 0, among coefficients of an Unsigned w-NAF key)=3.

In this implementation, the key generator 100 selects t(=3) groups ($k_6$, $k_8$, $k_{11}$) from the (m−(w−1)*t=20−(4−1)*3=11) groups ($k_1$, $k_2$, $k_3$, $k_4$, $k_5$, $k_6$, $k_7$, $k_8$, $k_9$, $k_{10}$, $k_{11}$).

The key generator 100 replaces respective selected t groups with a string which is set of positive odd integer equal to or less than $2^w$, and (w−1) zeros (S120). The substitute string at S120 includes one of positive odd integers equal to or less than $2^w$ following (w−1) zeros.

The key generator 100 replaces unselected groups with zeros (S130).

That is, the key generator 100 at S120 replaces the respective selected (t=3) groups with a string which includes (w−1=4−1=3) zeros and one positive odd integer equal to or less than $2^w$ (positive odd integers equal to or less than $2^4$: 1, 3, 5, 7, 9, 11, 13, 15).

For example, the key generator 100 at S130 may replace group $k_6$ with 0001, $k_8$ with 0005, and $k_{11}$ with 0003.

The key generator 100 replaces the respective unselected groups $k_1$, $k_2$, $k_3$, $k_4$, $k_5$, $k_7$, $k_9$, $k_{10}$ with zeros. As a value of the operation at S120 and S130, "$k_1 k_2 k_3 k_4 k_5 k_6 k_7 k_8 k_9 k_{10} k_{11}$" are replaced with "0 0 0 0 0 0001 0 0005 0 0 0003".

The key generator 100 outputs the coefficients generated through S110 to S130 as the Unsigned w-NAF key (S140). That is, the key generator 100 outputs "00000000100005000003" as the Unsigned w-NAF key.

The exponential operator 200 executes exponential operation using the Unsigned w-NAF key generated at the key generator 100 as an exponent (S210 to S260), which is described below.

First of all, the exponential operator 200 sets an exponential value ($g^{\text{the first coefficient, excluding 0}}$) as described below. The first coefficient, excluding 0, among coefficients of an Unsigned w-NAF key is an exponent, and g is a base (S210). That is, if the Unsigned w-NAF key is "00000000100005000003", the first coefficient, excluding 0, "1" (that is, $9^{th}$ coefficient) of "00000000100005000003" is the exponent, and g is the base such that "$g^1$" is obtained as the exponential value (y).

Next, if a following coefficient is 0 (S220-Y), the exponential operator 200 determines a square value ($y^2$) of the exponential value (y) to be a new exponential value (y) (S230).

That is, the exponential value ($y=g^1$) is replaced with a new exponential value ($y=g^2=(g^1)^2$), because the $10^{th}$ coefficient following the $9^{th}$ coefficient "1" is "0" in "00000000100005000003". Also because the $11^{th}$ coefficient is "0", the exponential value ($y=g^2$) is replaced with a new exponential value ($y=g^4=(g^2)^2$), because the $12^{th}$ coefficient is "0", the exponential value ($y=g^4$) is replaced with new exponential value ($y=g^8=(g^4)^2$), and because the $13^{th}$ coefficient is "0", exponential value ($y=g^8$) is replaced with a new exponential value ($y=g^{16}=(g^8)^2$).

Meanwhile, if a following coefficient is coefficient, excluding 0, (S220-N), the exponential operator 200 replaces the exponential value (y) with a new exponential value (y) based on a value ($y^2 * g^{\text{following coefficient}}$) multiplying square value of exponent by ($g^{\text{following coefficient}}$).

That is, the exponential value ($y=g^{16}$) is replaced with a new exponential value ($y=g^{37}=(g^{16})^2 * g^5$), because $14^{th}$ coefficient following the $13^{th}$ coefficient "0" is "5" in "00000000100005000003".

Operations S220 to S240 reiterate until there is no following coefficient (S250). That is, S220 to S240 is terminated when there is no following coefficient of the Unsigned w-NAF key.

If there is no following coefficient (that is, if the exponential operation is terminated) (S250-N), the exponential operator 200 outputs the exponential value (y) as the value of exponential operation (S260).

The encryption part 300 executes an encryption of the value outputted from the exponential operator 200 (S310).

So far, the operations of the encryption device of FIG. 1 were explained with reference to the FIG. 2, including i) the process of generating the Unsigned w-NAF key, ii) the process of executing exponential operation using the Unsigned w-NAF key as an exponent, and iii) the process of executing encryption with the value of exponential operation.

In the above general aspect, operation S120 replaces the respective selected t groups with a string consisting of (w−1) zeros and one of the positive odd number equal to or less than $2^w$. In an alternative general aspect of the present invention, the first string may exclude (w−1) zeros. That is, the first string may be "1" instead of "0001".

Moreover, operation S140 of the above general aspect outputs the string generated at S110 to S130 as the Unsigned w-NAF key. In an alternative general aspect, it is possible to output a string excluding the coefficients ahead of the first coefficient, excluding 0, of the string generated at S110 to S130 as the Unsigned w-NAF key. That is, "100005000003" may be outputted as the Unsigned w-NAF key, which is a string excluding the zeros ($1^{st}$ coefficient to $8^{th}$ coefficient) ahead of the first coefficient, excluding 0, "1" ($9^{th}$ coefficient) of "00000000100005000003" of the string generated at S110 to S130.

Figure 3:
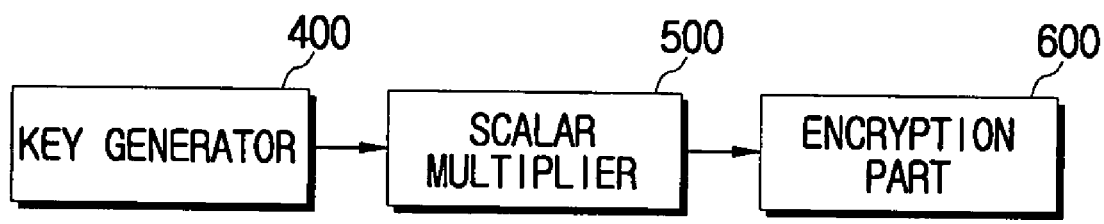
FIG. 3 is a block diagram illustrating an encryption device according to another general aspect.

Hereinafter, another general aspect is explained in detail with reference to the FIGS. 3 and 4. FIG. 3 is a block diagram of an encryption device according to another general aspect. The encryption device according to the general aspect generates and uses a key to reduce computational complexity of the scalar multiplication on an ellipse curve in executing the encryption.

Referring to FIG. 3, the encryption device according to a general aspect includes a key generator 400, a scalar multiplier 500, and an encryption part 600.

The key generator 400 generates a 'τ-adic w-NAF' key. The 'w-NAF' is described above and, 'τ' means $(x, y) \rightarrow (x^q, y^q)$ of Frobenius endomorphism map. The 'τ-adic w-NAF' is a form of combining 'τ' with 'w-NAF'.

The 'τ-adic w-NAF' key satisfies the following conditions:
1) coefficient, excluding 0, is non-divisible integer by q with an absolute value equal to or less than $q^w/2$, and
2) Of a string of a consecutive w number of coefficients, at most one coefficient, excluding 0.

The scalar multiplier 500 executes a scalar multiplication on the basis of a τ-adic w-NAF key generated by the key generator 400, and outputs the value.

The encryption part 600 executes an encryption using the value outputted from the scalar multiplier 500.

Figure 4:
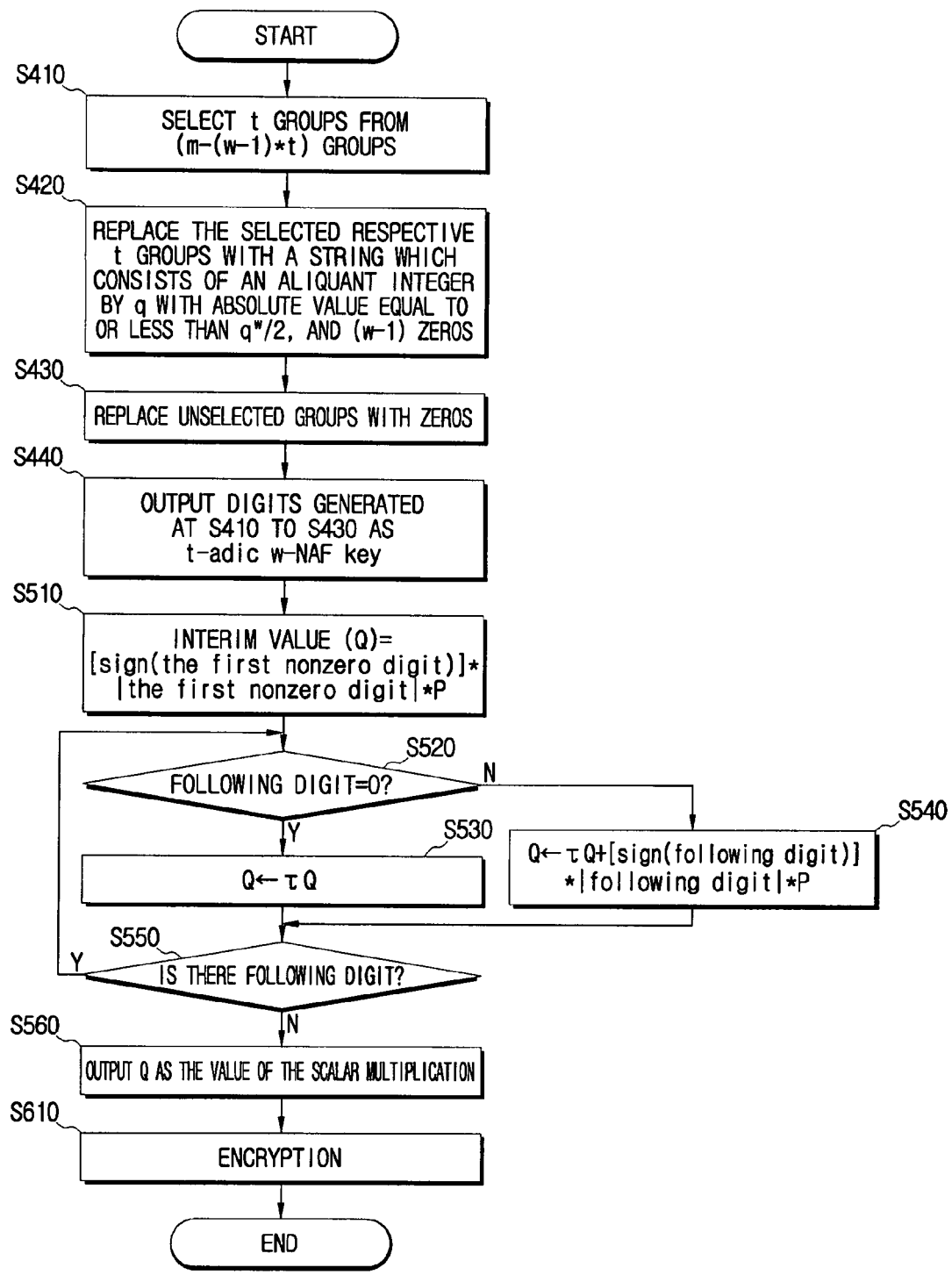
FIG. 4 is a flowchart illustrating a method for encryption according to another general aspect.

The following describes i) the process of generating τ-adic w-NAF key, ii) the process of executing scalar multiplication on the basis of the τ-adic w-NAF key, and iii) the process of executing the encryption using the value of scalar multiplication, with reference to the FIG. 4.

FIG. 4 is a flowchart illustrating a method for encryption according to another general aspect.

Referring to FIG. 4, the key generator 400 selects t groups from (m−(w−1)*t) groups (S410) where, i) m is an integer related to the number of coefficients of a τ-adic w-NAF key to generate, ii) w is the number of coefficients of selected groups and a positive integer equal to or more than 2, and iii) t is the number of coefficients, excluding 0, among coefficients of a τ-adic w-NAF key and a positive integer.

The key generator 400 replaces the selected respective t groups with a string which consists of a non-divisible integer by q with an absolute value equal to or less than $q^w/2$, and (w−1) zeros (S420). The substitute string at operation S420 is a string which consists of a non-divisible integer by q with absolute value equal to or less than $q^w/2$ following (w−1) zeros.

The key generator 400 replaces the unselected groups with zeros (S430), and outputs coefficients generated at S410 to S430 as the τ-adic w-NAF key (S440).

The scalar multiplier 500 executes the scalar multiplication on the basis of the τ-adic w-NAF key generated by the key generator 400 (S510 to S560). The operation will be described in detail below.

First of all, the scalar multiplier 500 searches the first coefficient, excluding 0, among coefficients of the τ-adic w-NAF key, and sets [sign(the first coefficient, excluding 0]*|the first coefficient, excluding 0|*P to be an interim value (Q) (S510).

Accordingly, i) if x is positive, sign(x)=1, ii) if x is negative, sign(x)=−1 and, iii) if x is zero, sign(x)=0. So, i) if the first coefficient, excluding 0, is positive, sign(the first coefficient, excluding 0)=1, and ii) if the first coefficient, excluding 0, is negative, sign(the first coefficient, excluding 0)=−1, where sign(x) is a function representing a sign of x.

If a following coefficient is zero (S520-Y), the scalar multiplier 500 replaces the interim value (Q) with a new interim value (τQ), which is obtained by applying Frobenius endomorphism map to the interim value (Q) (S530).

Meanwhile, if a following coefficient is coefficient, excluding 0, (S520-N), the scalar multiplier 500 replaces the interim value (Q) with a new interim value (τQ+[sign(following coefficient)]*|following coefficient|*P), which is obtained by adding a value (τQ) obtained by applying Frobenius endomorphism map with [sign(following coefficient)]*|following coefficient|*P (S540).

Operations S520 to S540 reiterate until there is no following coefficient (S550). That is, S520 to S540 is terminated when there is no following coefficient of the τ-adic w-NAF key.

If there is no following coefficient (that is, if the scalar multiplication is terminated) (S550-N), the scalar multiplier 500 outputs the interim value (Q) as the value of the scalar multiplication (S560).

Accordingly, the encryption part 600 executes the encryption using the value of scalar multiplication outputted from the scalar multiplier 500 (S610).

So far, operations of the encryption device of FIG. 3 were explained with reference to the FIG. 4, including i) the process of generating the τ-adic w-NAF key, ii) the process of executing the scalar multiplication on the basis of the τ-adic w-NAF key, and iii) the process of executing the encryption using the value of the scalar multiplication.

Operation S420 of the above general aspect replaces a selected respective t groups with a string which consists of a non-divisible integer by q with absolute value equal to or less than $q^w/2$, and (w−1) zeros. In an alternative general aspect, the first string may exclude (w−1) zeros.

Also, operation S440 of the general aspect outputs the string generated at S410 to S430 as the τ-adic w-NAF key. In an alternative general aspect, it is possible to output a string excluding the coefficients ahead of the first coefficient, excluding 0, of string generated at S410 to S430 as the τ-adic w-NAF key.

Meanwhile, i) the method for generating a sparse w-NAF key such as the Unsigned w-NAF key or the τ-adic w-NAF key, ii) the method for executing exponential operation or the scalar multiplication using sparse w-NAF key as an exponent, and iii) the method for executing the encryption using operation value, can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the general aspect can be easily construed as within the scope of the aspect by programmers skilled in the art to which the general aspect pertains. As it will be embodied readily on the basis of the above contents by one skilled in the art, detailed description thereof will be omitted for clarity and conciseness.

A general aspect may be applicable to an electronic device which is capable of implementing a key generation, an exponential operation, a scalar multiplication, or an encryption. The electronic device also may include mobile devices of low computational complexity.

As described above, in general aspects, an encryption is executed through exponential operation or scalar multiplication using a sparse w-NAF key such as an 'Unsigned w-NAF key' or a 'τ-adic w-NAF key' having the scarce coefficients, excluding 0. Accordingly, a computational complexity of exponential operation or scalar multiplication can be reduced such that an encryption pace is improved.

While certain methods, mediums, and devices have been shown and described herein with reference to certain aspects thereof, it will be understood by those skilled in the art that various changes in form and details may be made therein without departing from the spirit and scope of the methods, mediums, and devices as defined by the appended claims and their equivalents.

What is claimed is:

1. A method for generating a key, comprising:
    generating a string of a number of coefficients, in which at most one coefficient, excluding 0, among a consecutive w number of coefficients, corresponds to a positive odd integer equal or less than $2^w$, where w is a natural number equal to or greater than 2; and
    outputting the generated string as the key;
    wherein at least one of the generating of the string and outputting of the generated string is performed by hardware or a combination of hardware and software.

2. The method of claim 1, wherein the generating of the string comprises:
    selecting t groups from (m−(w−1)*t) groups;

replacing the respective selected t groups with a string of coefficients having the positive odd integer equal to or less than $2^w$ and (w−1) zeros; and replacing unselected groups with zeros and generating the string, wherein m and t are positive integers.

3. The method of claim 2, wherein the positive odd integer equal to or less than $2^w$ of the string follows the (w−1) zeros.

4. The method of claim 1, wherein outputting the generated string comprises excluding coefficients ahead of a first coefficient, excluding 0, of the generated string.

5. A method for exponential operation, comprising:

generating a key of a number of coefficients, in which at most one coefficient, excluding 0, among a consecutive w number of coefficients, corresponds to a positive odd integer equal to or less than $2^w$, where w is a natural number equal to or greater than 2; and executing an exponential operation using the generated key as an exponent;

wherein at least one of the generating of the key and the executing of the exponential operation is performed by hardware or a combination of hardware and software.

6. The method of claim 5, wherein the generating of the key comprises:

selecting t groups from (m−(w−1)*t) groups;

replacing the respective selected t groups with a string having the positive odd integer equal to or less than $2^w$ and (w−1) zeros; and replacing unselected groups with zeros and generating the key.

7. A method for encryption, comprising:

generating a key of a number of coefficients, in which at most one coefficient, excluding 0, among a consecutive w number of coefficients, corresponds to a positive odd integer equal to or less than $2^w$, where w is a natural number equal to or greater than 2;

executing an exponential operation using the generated key as an exponent; and executing the encryption using a value of the exponential operation, wherein at least one of the generating of the key, the executing of the exponential operation, and the executing of the encryption is performed by hardware or a combination of hardware and software.

8. The method of claim 7, wherein the generating of the key comprises:

selecting t groups from (m−(w−1)*t) groups;

replacing the respective selected t groups with a string having the positive odd integer equal to or less than $2^w$ and (w−1) zeros; and replacing unselected groups with zeros and generating the key.

9. A method for generating a key, comprising:

generating a string of a number of coefficients, in which at most one coefficient, excluding 0, among a consecutive w number of coefficients, corresponds to a non-divisible integer by q with an absolute value equal to or less than $q^w/2$; and outputting the generated string as the key;

wherein at least one of the generating of the string and outputting of the generated string is performed by hardware or a combination of hardware and software.

10. The method of claim 9, wherein the generating of the string comprises:

selecting t groups from (m−(w−1)*t) groups;

replacing the respective selected t groups with a string having the non-divisible integer by q with absolute value equal to or less than $q^w/2$, and (w−1) zeros; and replacing unselected groups with zeros and generating the string, wherein m and t are positive integers.

11. The method of claim 10, wherein the non-divisible integer by q with absolute value equal to or less than $q^w/2$ follows the (w−1) zeros.

12. The method of claim 9, wherein the outputting of the generated string comprises outputting a string excluding coefficients ahead of a first coefficient, excluding 0, of the generated string as the key.

13. A method of scalar multiplication, comprising:

generating a key of a number of coefficients, in which at most one coefficient, excluding 0, among a consecutive w number of coefficients, corresponds to a non-divisible integer by q with an absolute value equal to or less than $q^w/2$; and executing scalar multiplication on a basis of the key;

wherein at least one of the generating of the key and the executing of scalar multiplication is performed by hardware or a combination of hardware and software.

14. The method of claim 13, wherein the generating of the key comprises:

selecting the t groups from (m−(w−1)*t) groups;

replacing the respective selected t groups with a string having the non-divisible integer by q with absolute value equal to or less than $q^w/2$, and (w−1) zeros; and generating the string by replacing unselected groups with zeros, wherein m and t are positive integers.

15. A method for encryption, comprising:

generating a key of a number of coefficients, in which at most one coefficient, excluding 0, among a consecutive w number of coefficients, corresponds to a non-divisible integer by q with an absolute value equal to or less than $q^w/2$;

executing scalar multiplication on the basis of the generated key; and executing the encryption using a value of the scalar multiplication, wherein at least one of the generating of the key, the executing of scalar multiplication, and the executing of the encryption is performed by hardware or a combination of hardware and software.

16. The method of claim 15, wherein the generating of the key comprises:

selecting the t groups from (m−(w−1)*t) groups;

replacing the respective selected t groups with a string having the non-divisible integer by q with absolute value equal to or less than $q^w/2$, and (w−1) zeros; and replacing unselected groups with zeros and generating the key, wherein m and t are positive integers.

17. A non-transitory computer-readable recording medium, which writes thereon a program for executing:

generating a string of a number of coefficients, in which at most one coefficient, excluding 0, among a consecutive w number of coefficients, corresponds to a positive odd integer equal to or less than $2^w$, where w is a natural number equal to or greater than 2; and outputting the generated string as a key.

18. A non-transitory computer-readable recording medium storing a program, comprising:

a first set of instructions for generating a string of a number of coefficients, in which at most one coefficient, excluding 0, among a consecutive w number of coefficients, corresponds to a non-divisible integer by q with an absolute value equal to or less than $q^w/2$; and a second set of instructions for outputting the generated string as a key.

19. An encryption device, comprising:

a key generator configured to generate a key of a number of coefficients, in which at most one coefficient, excluding 0, among a consecutive w number of coefficients, corresponds to a positive odd integer equal to or less than $2^w$, where w is a natural number equal to or greater than 2;

an exponential operator configured to execute an exponential operation using the generated key as an exponent; and an encryption part configured to execute encryption using a value of the exponential operation, wherein at least one of the key generator, the exponential operator, and the encryption part is implemented as hardware or a combination of hardware and software.

20. An encryption device, comprising:

a key generator configured to generate a key of a number of coefficients, in which at most one coefficient, excluding 0, among a consecutive w number of coefficients, corresponds to a non-divisible integer by q with an absolute value equal to or less than $q^w/2$;

a scalar multiplier configured to execute scalar multiplication on the basis of the generated key; and an encryption part configured to execute an encryption using a value of the scalar multiplication, wherein at least one of the key generator, the scalar multiplier, and the encryption part is implemented as hardware or a combination of hardware and software.

* * * * *